United States Patent
Lindqvist

(12) 
(10) Patent No.: US 9,527,145 B2
(45) Date of Patent: Dec. 27, 2016

(54) SAW ATTACHMENT MECHANISM

(75) Inventor: Anders Lindqvist, Orebro (SE)

(73) Assignee: HUSQVARNA AB, Huskvarna (SE)

( * ) Notice: Subject to any disclaimer, the term of this patent is extended or adjusted under 35 U.S.C. 154(b) by 288 days.

(21) Appl. No.: 13/819,327

(22) PCT Filed: Aug. 31, 2011

(86) PCT No.: PCT/SE2011/051043
§ 371 (c)(1),
(2), (4) Date: Feb. 26, 2013

(87) PCT Pub. No.: WO2012/030288
PCT Pub. Date: Mar. 8, 2012

(65) Prior Publication Data
US 2013/0174706 A1 Jul. 11, 2013

Related U.S. Application Data

(60) Provisional application No. 61/378,755, filed on Aug. 31, 2010.

(51) Int. Cl.
*B23D 47/02* (2006.01)
*B23D 45/02* (2006.01)
*B28D 1/04* (2006.01)

(52) U.S. Cl.
CPC ............ *B23D 47/02* (2013.01); *B23D 45/027* (2013.01); *B28D 1/045* (2013.01); *Y10T 83/768* (2015.04);
(Continued)

(58) Field of Classification Search
CPC ....... B23D 45/027; B23D 47/02; B23D 45/02; B23D 45/021; B28D 1/045; B28D 1/04; Y10T 403/32254; Y10T 83/768; Y10T 83/8821; B27B 5/29
(Continued)

(56) References Cited

U.S. PATENT DOCUMENTS 2,565,853 A * 8/1951 Jacobson ................... 384/53
5,588,418 A 12/1996 Holmes et al.
(Continued)

FOREIGN PATENT DOCUMENTS

| DE | 102004014837 B3 | 5/2005 |
| DE | 102004014837 B3 * | 5/2005 |
| WO | 8805370 A1 | 7/1988 |

OTHER PUBLICATIONS

International Search Report and Written Opinion of PCT/SE2011/051043 filed Nov. 25, 2011.
(Continued)

*Primary Examiner* — Stephen Choi
(74) *Attorney, Agent, or Firm* — Nelson Mullins Riley & Scarborough LLP

(57) ABSTRACT

A saw attachment mechanism includes at least one guide roller configured for releasable engagement with a track, a guide roller shaft and a guide roller pivot, each coupled to the guide roller, at least one pushrod configured for engagement with the guide roller shaft, and a cam shaft coupled to a handle. The guide roller can rotate around a guide roller axle. The guide roller pivot is coupled to the one guide roller to allow rotation of the guide roller and guide roller shaft toward and away from an engaged configuration. The pushrod can engage the guide roller shaft at a first end and the cam shaft at a second end. As the cam shaft is rotated, the pushrod slides to engage the guide roller shaft, to swing the guide roller shaft into an engaged position.

16 Claims, 7 Drawing Sheets

(52) U.S. Cl.
CPC ..... *Y10T 83/8821* (2015.04); *Y10T 403/32254* (2015.01)

(58) Field of Classification Search
USPC .......................................................... 83/574
See application file for complete search history.

(56) References Cited

U.S. PATENT DOCUMENTS

| | | | |
|---|---|---|---|
| 5,848,930 A * | 12/1998 | Jones ............................ | 451/237 |
| 6,712,061 B1 * | 3/2004 | Kalb .............................. | 125/10 |
| 2006/0201492 A1 | 9/2006 | Baratta et al. | |
| 2007/0163412 A1 * | 7/2007 | Baratta et al. .................. | 83/651 |
| 2009/0007742 A1 * | 1/2009 | Nie et al. ...................... | 83/471.3 |
| 2010/0300258 A1 * | 12/2010 | Werder et al. .................. | 83/483 |

OTHER PUBLICATIONS

Chapter II International Preliminary Report on Patentability of PCT/SE2011/051043 filed Nov. 14, 2012.

* cited by examiner

SAW ATTACHMENT MECHANISM

FIELD

The present disclosure generally relates to saws, and more specifically relates to attachment mechanisms for saws.

BACKGROUND

Moveable machining equipment are typically large and difficult to maneuver pieces of equipment. Wall saws are an example of movable machining equipment. Wall saws can typically include with a disc-shaped blade, which is securable on a to-be-cut wall and is designed for cutting stone and the like. For example, wall saws can be used in a construction industry to cut out an opening in a wall in several offset steps by separating appropriate wall pieces. The to-be-cut wall can be a wall of a room, a ceiling, or the floor. In some implementations, the wall saw can be incorporated into a transport mechanism that drives the wall saw across the to-be-cut wall, so that the transport mechanism and the wall saw mechanisms are effectively integrated into a single unit. In some implementations, the wall saw can be a separate mechanism from the transport mechanism. For example, wall saws can be coupled to a track to provide a controlled movement of the wall saw to cut through the to-be-cut wall. In such an implementation, the wall saw can be configured to releasably attach to the track.

BRIEF DESCRIPTION OF THE DRAWINGS

Exemplary methods and arrangements conducted and configured according to the advantageous solutions presented herein are depicted in the accompanying drawings wherein.

DETAILED DESCRIPTION

Figure 1:
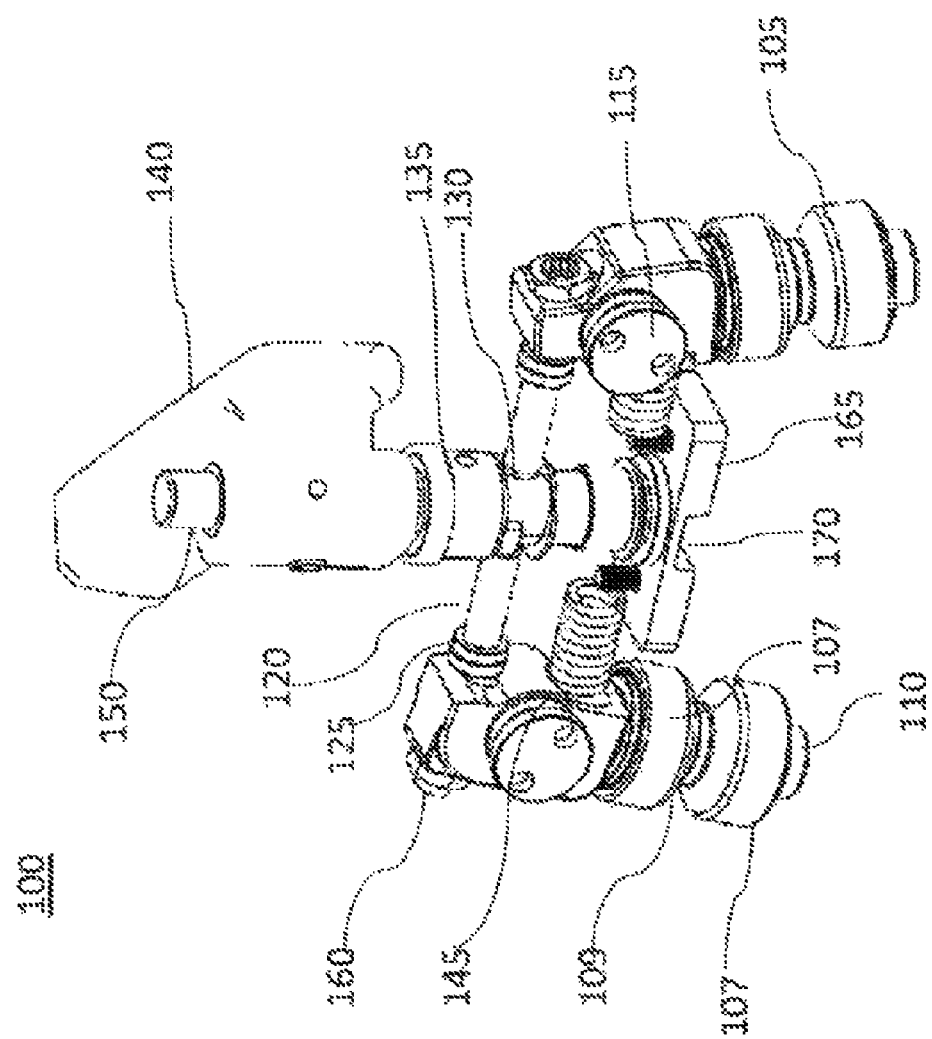
FIG. 1 illustrates the internal components of an exemplary saw attachment mechanism in accordance with the present disclosure.

As will be appreciated for simplicity and clarity of illustration, where appropriate, reference numerals have been repeated among the different figures to indicate corresponding or analogous elements. In addition, numerous specific details are set forth in order to provide a thorough understanding of the implementations described herein. However, those of ordinary skill in the art will understand that the implementations described herein can be practiced without these specific details. In other instances, methods, procedures and components have not been described in detail so as not to obscure the related relevant feature described. Also, the description is not to be considered as limiting the scope of the implementations described herein.

Wall saws guided on tracks are typically loaded onto a track from either the bottom or the top of the track. As a result, when component of the wall saw needs to be replaced or when the wall saw needs maintenance, the wall saw must be removed from the track by sliding the wall saw off of the track from the bottom end or the top end of the track, thereby causing user frustration. The need to remove the wall saw from the top end or the bottom end of the track can also decrease the efficiency of wall saw cutting, add to the time for wall saw cutting, and disrupt a rhythm and continuous flow of the wall saw cutting process. In other instances, the saw blade of the wall saw must be removed prior to removing the wall saw from the track. Similarly, the additional step of removing the saw blade from the wall saw can cause user frustration and interrupt the efficiency of wall saw cutting. A saw attachment mechanism is described in the present disclosure.

An exemplary embodiment of a saw attachment mechanism includes at least one guide roller, at least one roller axle and an at least one guide roller pivot, each coupled to one of the at least one guide roller, at least one pushrod configured for engagement with one of the at least one guide roller shaft, and a cam shaft coupled to a handle. The saw attachment mechanism includes an engaged configuration and a disengaged configuration. The at least one guide roller is configured for releasable engagement with a track, which is adapted for placement and support on a wall to be cut by the wall saw. The at least one guide roller shaft has a first end and a second end. The at least one guide roller shaft can be coupled to the guide roller to allow the guide roller to rotate around the guide roller shaft. The at least one guide roller pivot is coupled to the at least one guide roller and is configured to allow rotation of the at least one guide roller toward and away from an engaged configuration. The at least one guide roller pivot can also be configured to allow the guide roller shaft to swing toward and away from an engaged configuration, thereby bringing the at least one guide roller toward and away from an engaged configuration. The pushrod is configured for engagement with one of the at least one guide roller shaft at the first end and the cam shaft at the second end. The cam shaft can be rotatable coupled to a handle. In at least one implementation, when the handle is rotated, the cam shaft is rotated. As the cam shaft is rotated, the pushrod can slide to engage the at least one guide roller shaft, thereby applying a force to cause the at least one guide roller shaft to swing away from a disengaged position.

Figure 2:
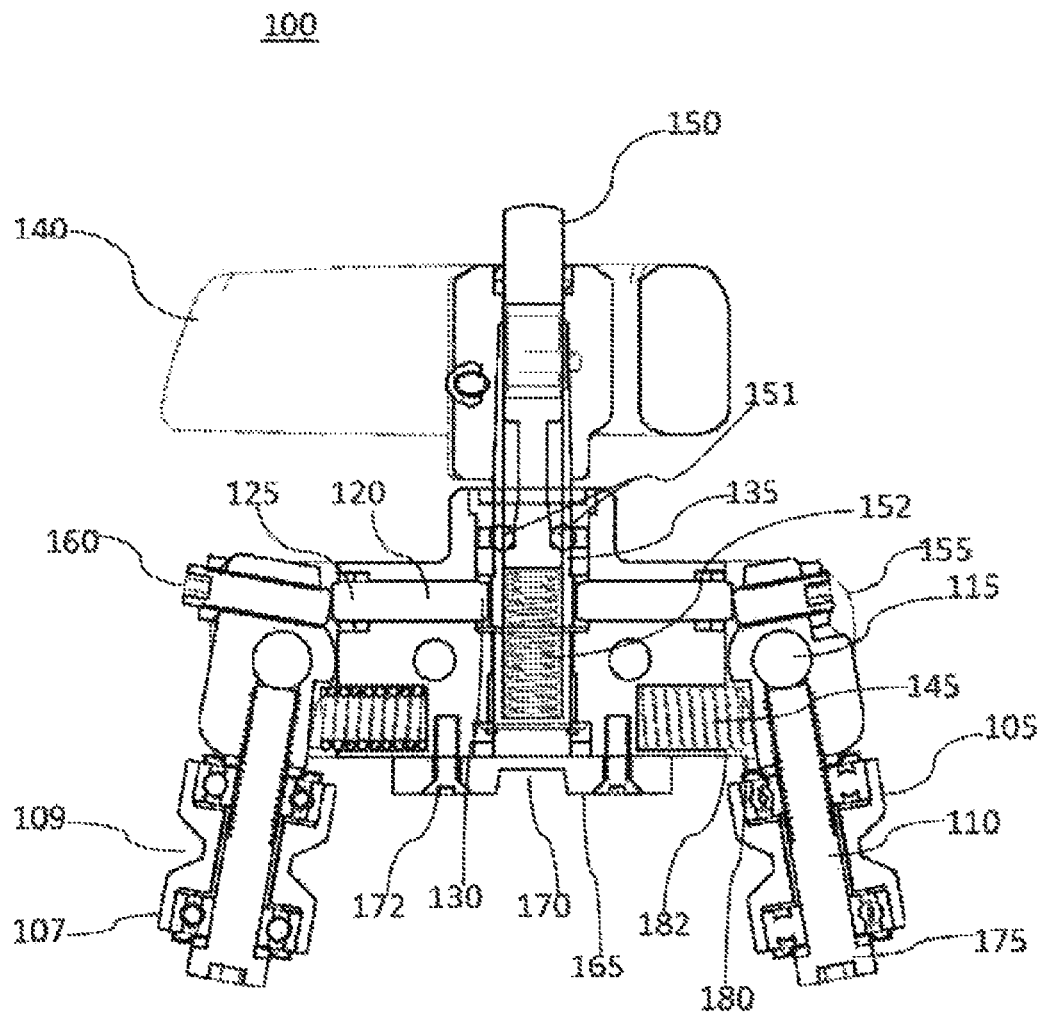
FIG. 2 illustrates an cross-sectional view of the internal components illustrated in FIG. 1 housed in a saw attachment mechanism body in accordance with the present disclosure.
Figure 3:
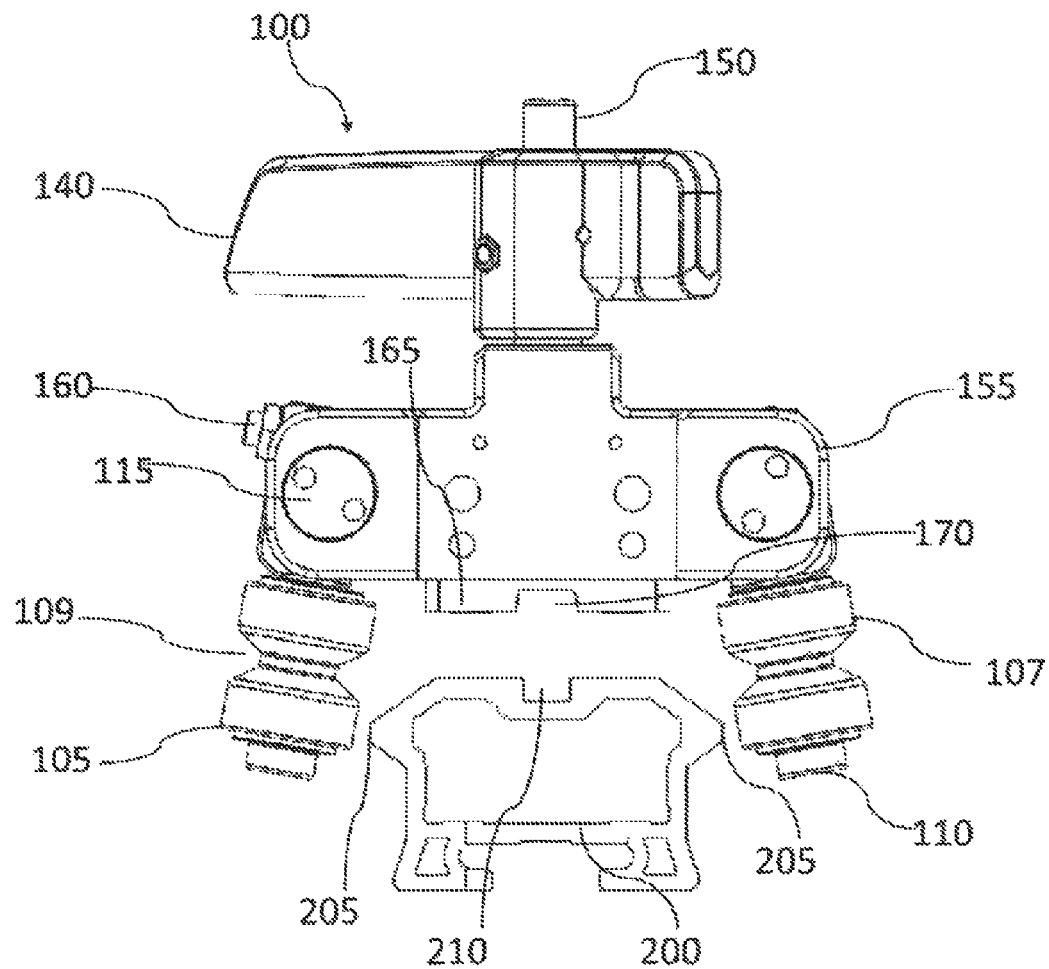
FIG. 3 illustrates a plan view of the exemplary saw attachment mechanism illustrated in FIG. 2 and a track on which the saw attachment mechanism can engage.

FIG. 1 is a plan view of the internal component of a saw attachment mechanism in a disengaged configuration, also shown in FIGS. 2 and 3. The saw attachment mechanism 100 is configured to be coupled to a wall saw (shown in FIG. 5). In the illustrated embodiment of FIG. 1, the saw attachment mechanism 100 includes a cam shaft 135 coupled to a handle 140. In the exemplary embodiment of FIG. 1, the handle 140 is rotatably coupled to the cam shaft 135 such that rotating the handle 140 rotates the cam shaft 135. A pair of pushrods 120 is coupled to the cam shaft 135 such that each pushrod 120 is coupled to opposite sides of the cam shaft 135. Each pushrod 120 has a first end 125 and a second end 130, and the second end is configured to engage the cam shaft 135. Each first end 125 of the pushrods 120 is configured to engage a guide roller shaft 110. While the illustrated embodiment shows a pair of pushrods 120, the pair of pushrods 120 can be a single integrated pushrod that is coupled to the cam shaft 135 proximate to the center of the pushrod and that is configured to engage a guide roller shaft 110 at one of the ends of the single integrated pushrod.

In FIG. 1, there can be a pair of guide roller shafts 110 that are guide roller axles, and each one of the guide roller shafts 110 is configured to engage a respective one of the part of pushrods 120 when the cam shaft 135 is rotated. A pair of guide rollers 105 can each be coupled to a respective guide roller shaft 110. Each guide roller 105 is coupled to the guide roller's 105 respective guide roller shaft 110 such that the guide roller 105 can rotate around its respective guide roller shaft 110. In other words, in FIG. 1, the guide roller shaft 110 is a guide roller axle around which the respective guide roller rotates.

Also, in FIG. 1, a pair of guide roller pivots 115 can each be coupled to a respective one of the pair of guide roller 105. In the illustrated embodiment of FIG. 1, the guide roller pivots 115 are guide roller pivot bolts that are coupled to a respective guide roller 105 by the respective guide roller shaft 110. Each guide roller pivot 115 can be configured to allow the respective guide roller shaft 110 to swing toward and away from an engaged configuration (not shown), thereby allowing the respective guide roller 105 to swing toward and away from the engaged configuration (not shown). Each guide roller 105 is configured to engage with a track (shown in FIG. 4) of a wall saw assembly. When the guide roller 105 engages the track, the saw attachment mechanism 100 secures the wall saw to the track. For example, in FIG. 1, each guide roller 105 comprises two roller portions 107 that form a groove 109 therebetween. The groove 109 is adapted to receive and engage the track of the wall saw assembly. As illustrated in FIG. 1, each of the roller portions 107 of the guide roller 105 provide a boundary for the track, thereby ensuring that the wall saw is secured to the track. Additionally, as the roller portions 107 are configured to rotate, the roller portions 107 allow the wall saw to slide or traverse the track of the wall saw assembly. While the illustrated embodiment in FIG. 1 illustrates a guide roller 105 comprising a single roller having two roller portions 107, one of ordinary skill in the art will appreciate that the guide roller 105 can have a plurality rollers, for example, two rollers. Further details as to the implementation of the saw attachment mechanism 100 to a wall saw and the cooperation of the saw attachment mechanism 100 with the wall saw will be discussed in relation to FIGS. 4 and 5.

In the engaged configuration, the handle 140 is rotated in a first direction to place the saw attachment mechanism 100 in a disengaged configuration. When the handle 140 is rotated to place the saw engagement mechanism 100 in the disengaged configuration, the cam shaft 135 is also rotated in the first direction. In the disengaged position, at least one of the pushrods 120 is slid or pushed diametrically inward toward the cam shaft 135, thereby rotating a respective one of the guide roller pivots 115 towards the cam shaft 135 in a direction to rotate the guide roller shaft 110 inwardly towards the cam shaft 135. As the respective guide roller pivot 115 is pivoted, the respective guide roller shaft 110 can be swung away from the cam shaft 135 thereby swinging the respective guide roller 105 away from the cam shaft 135 to disengage the respective guide roller 105 from the track. As the guide roller 105 engages the track, the wall saw can be removed from the track at its current position, rather than having to move the wall saw to a top or bottom of the track.

In the exemplary embodiment of the saw attachment mechanism 100 illustrated in FIG. 1, the saw attachment mechanism 100 further includes a pair of return springs 145 for biasing the pair of guide rollers 105 to a disengaged position 1000. in FIG. 1, each return spring 145 is coupled at a distal end to a respective one of the pair of guide roller shafts 110 proximate to the respective guide roller pivot 115 coupled to the guide roller shaft 110. In FIG. 1, the natural state of each return spring 145 (for example, when the return spring 145 is unloaded) is in the disengaged configuration 1000 of the saw attachment mechanism 100.

In the disengaged configuration, the handle 140 is rotated in a second direction opposite from the first direction, thereby rotating the cam shaft 135 in the second direction. When the cam shaft 135 is rotated in the second direction, the cam shaft 135 engages the second end 130 of at least one of the pushrods 120, thereby pushing the at least one pushrod 120 in a direction diametrically away from the cam shaft 135. As the at least one pushrod 120 is pushed diametrically away from the cam shaft 135, the first end 125 of the respective pushrod 120 engages a respective one of the guide roller shafts 110. The pushrod 120 pushes the respective guide roller shaft 110 such that the guide roller pivot 115 also pivots the guide roller 105 toward the cam shaft 120. When the pushrod 120 pushes the at least one guide roller shaft 110, the respective guide roller pivot 115 is pivoted so that the respective guide roller shaft 110 is swung toward the cam shaft 135, thereby swinging the respective guide roller 105 toward the cam shaft 135 to engage the guide roller 105 to the track. As the guide roller 105 engages the track, the wall saw engages the track. In the exemplary embodiment of FIG. 1, in the disengaged configuration, the return springs 145 are unloaded to push the guide roller shafts 110 away from the cam shaft 135, thereby pushing the guide rollers 105 away from the track to release the wall saw from the track.

Although the return spring 145 can be coupled to the cam shaft 135 at a proximal end of the spring 145, in other embodiments, the return spring 145 and the cam shaft 135 can be coupled to the housing body. While the illustrated embodiment of FIG. 1 illustrates the implementation of return springs 145 to aid in the engagement and disengagement configurations of the wall saw attachment, one of ordinary skill in the art will appreciate that other biasing mechanisms or mechanical couplings can be implemented. Additionally, one of ordinary skill in the art will appreciate that return springs 145 are not necessary. For example, the pushrods 120 can be coupled both to the cam shaft 135 and to the guide roller shafts 110 by universal joints, for example, that can bias the at least one guide roller shaft 110 to the engaged configuration. In another alternative embodiment, universal joints and return springs can be implemented to bias the at least one guide roller shaft to the engaged configuration.

In at least one embodiment, the saw attachment mechanism 100 includes a handle rotation control mechanism 150 to prevent rotation of the handle 140. In the embodiment illustrated in FIG. 1, the handle rotation control mechanism 150 is a push button. In such an embodiment, the rotation control mechanism 150 can be biased in a lock position, thereby keeping the guide rollers 105 engaged to the track and securing the wall saw to the track. Alternatively, when the handle rotation control mechanism 150 is actuated to place the rotation control mechanism 150 in an unlock position, the handle 150 can be rotated, thereby swinging the guide rollers 105 away from an engaged configuration and into a disengaged configuration. As the handle 140 can be rotated to swing the guide rollers 105 into a disengaged configuration, the guide rollers 105 no longer engage the track, and the wall saw can be removed from the track.

FIG. 1 further illustrates a rack receiver 165 adapted to engage a rack of the track. The rack of the track can be the portion of the track that can pull the wall saw up or down the track. In at least one embodiment, the rack can have teeth on which the motor of the wall saw engages to permit the traversal of the wall saw along the track. In FIG. 1, the rack receiver 165 is a plate having a slot 170 formed therein. The slot 170 is shaped to correspond with the rack of the track (for example, to correspond to the shape of the teeth of the track). Also illustrated in FIG. 1, the proximal end of the return spring 145 and the cam shaft 135 are coupled to the rack receiver 165. However, in an alternative embodiment, the return spring 145 and the cam shaft 135 can be coupled to the housing body (shown in FIGS. 2 and 3).

FIG. 1 also illustrates an adjustment mechanism 160 adapted to control the pivoting of at least one of the guide roller shafts 110. For example, in FIG. 1, the adjustment mechanism 160 is coupled to one of the pair of guide roller shafts 110. The adjustment mechanism can be an adjustable bolt which can be unscrewed and screwed to adjust the angle at which the respective guide roller shaft 110 swings when the saw attachment mechanism 100 is placed in a disengaged configuration and an engaged configuration. The adjustment mechanism 160 can be configured to tighten the respective guide roller against the track when the saw attachment mechanism 100 is in the engaged configuration. In an alternative embodiment, the adjustment mechanism 160 can be configured to remove the lash of the wall saw during cutting operations. Although one adjustment mechanism 160 is illustrated in FIG. 1, one of ordinary skill in the art will appreciate that the wall attachment mechanism 100 can include more than one adjustment mechanism, for example, a pair of adjustment mechanisms. In such an embodiment comprising a pair of adjustment mechanisms, a second adjustment mechanism can be coupled to the guide roller shaft 100 which is not coupled to the first adjustment mechanism 160. In such an alternative embodiment, the first adjustment mechanism can be adapted to tighten the respective guide roller against the track, and the second adjustment mechanism can be adapted to remove the lash of the wall saw during cutting operations.

While FIG. 1 illustrates a pair of guide rollers, a pair of guide roller shafts, a pair of pushrods, and a pair of return springs, one of ordinary skill in the art will appreciate that fewer or more than two guide rollers, guide roller shafts, pushrods, and return springs can be implemented. In at least one embodiment, the saw attachment mechanism 100 can have at least one guide roller, at least one guide roller shaft, a pushrod, and a return spring. In an alternative embodiment, the saw attachment mechanism 100 can have a plurality of guide rollers, a plurality of guide roller shafts, a plurality of pushrods, and a plurality of return springs.

FIG. 2 is a cross-sectional view of the internal components illustrated in FIG. 1 housed in a body of the saw attachment mechanism 100. The internal components in FIG. 2 are substantially similar to the internal components illustrated in FIG. 1. FIG. 2 differs from FIG. 1 that FIG. 2 illustrates a body 155 housing the pushrods 120, at least a portion of the cam shaft 135, and at least a portion of each of the guide roller shafts 110.

Also illustrated in FIG. 2 are the internal components of the handle rotation control mechanism 150. As illustrated in FIG. 2, the handle rotation control mechanism 150 is a push button and includes a biasing mechanism 151, an opening formed within the cam shaft 135, and spring 152 coupled to the cam shaft 135. When the handle control mechanism 150 is actuated, the push button is depressed thereby compressing the spring 152 and disengaging the biasing mechanism 151 from the opening to allow the handle 140 to rotate, and consequently allowing the cam shaft 135 to rotate. When the handle control mechanism 150 is unactuated, the push button is released, and the spring 152 returns the push button upwards to the unactuated position. Also, when the handle control mechanism 150 is unactuated, the biasing mechanism 151 is re-engages the opening formed in the shaft 135 to lock the handle in place and prevent rotation of the handle 140 until the push button is actuated. In FIG. 2, the biasing mechanism 151 is a pair of ball bearings but fewer or more ball bearings can be implemented. One of ordinary skill in the art will appreciate that the biasing mechanism 151 can be a biased pin or any other biasing mechanism that permits the handle 140 to rotate when the push button is depressed and that prevents the handle 140 from rotating when the push button 150 is released and in an unactuated position.

FIG. 2 further illustrates that the rack receiver 165 can be bolted by at least one bolt 172 to the body 155 of the saw attachment mechanism 100. However, one of ordinary skill in the art will appreciate that the rack receiver 165 can be secured to the body 155 by any other attachment. For example, the rack receiver 165 can be screwed on to the body 155, adhered to the body, welded to the body, or secured to the body 155 by any other attachment.

In the illustrated embodiment of FIG. 2, the saw attachment mechanism 100 can further include an adjustment screw 175 adapted to adjust the height of a corresponding guide roller 105. The adjustment screws 175 can be adapted to adjust the vertical position of a respective guide roller 105 with respect to the respective guide roller pivot 115. For example, in FIG. 2, the adjustment screw 175 can be rotated in a first direction to bring the respective guide roller 105 proximate to the respective guide roller pivot 115; alternatively, the adjustment screw 175 can be rotated in a second direction opposite to the first direction to move the respective guide roller away from the respective guide roller pivot 115. In at least one embodiment, the adjustment screw 175 can adjust the height of the motor of the wall saw with respect to the track. While FIG. 2 illustrates that the adjustment screw 175 is the same structure as the guide roller shaft 110, one of ordinary skill in the art will appreciate that the adjustment screw 175 can be a separate structure from the guide roller shaft 110.

FIG. 2 further illustrates a guide roller shaft stop 180 configured to prevent rotation of at least one of the guide roller shafts 110 from rotating beyond a predetermined angle of rotation. In FIG. 2, the guide roller shaft stop 180 is a lug, but other types of roller axle stops 180 can be implemented in accordance with this disclosure. In FIG. 2, when the saw attachment mechanism 100 is placed in a disengaged position as the guide roller shaft 110 is pivoted inwardly towards the cam shaft 135, the guide roller shaft stop 180 encounters and engages the body 155 encasing one of the return springs 145 at an edge 182 proximate to the respective return spring 145 and the rack receiver 165. When the guide roller shaft stop 180 engages the 182 of the body 155, the guide roller shaft 110 can be prevented from pivoting inward towards the cam shaft 135, thereby preventing the guide roller shaft 110 from rotating beyond a predetermined angle of rotation.

FIG. 3 is a plan view of the saw attachment mechanism illustrated in FIG. 2 positioned relative to a track of a wall saw assembly. In FIG. 3, the track 200 is a polygonal structure having a projection 205 on at least one side of the track 200. The projection 205 is adapted to be received in the groove 109 formed within the guide roller 105 of the saw attachment mechanism 100. Specifically, in the embodiment illustrated in FIG. 3, two roller portions 107 of the guide roller 105 form the groove 109 which is configured to receive the projection 205 of the track 200. Also illustrated in FIG. 3, the projection 205 of the track 200 is shaped to correspond to the shape of the groove 109. The illustrated embodiment in FIG. 3 illustrates two projections 205 on the track 200, one on each side of the track 200. Additionally, each projection 205 is configured to be received within one of the grooves 109 of the pair of guide rollers 105. As the projections 205 of the track are bound by the roller portions 107 of the guide roller 105 on a top side and a bottom side, the saw attachment mechanism 100 (and therefore the wall saw) is secured to the track 200. The track 200 illustrated in FIG. 3 further includes a passage 210 formed on a face of the track 200 facing the rack receiver 165 when the saw attachment mechanism 100 is engaged with the track. The passage 210 is configured to receive a plurality of gear teeth which can be adapted to engage the slot 170 of the rack receiver 165. The cooperation and engagement of the gear teeth with the slot 170 of the rack receiver 165 assist in aligning the saw attachment mechanism and, consequently, the wall saw with the track 200. Additionally, the cooperation and engagement of the teeth with the slot 170 allow the wall saw to traverse the track 200. A more detailed illustration of the assembly of the wall saw to the track 200 by the saw attachment mechanism 100 disclosed herein will be described in relation to FIG. 5.

Figure 4:
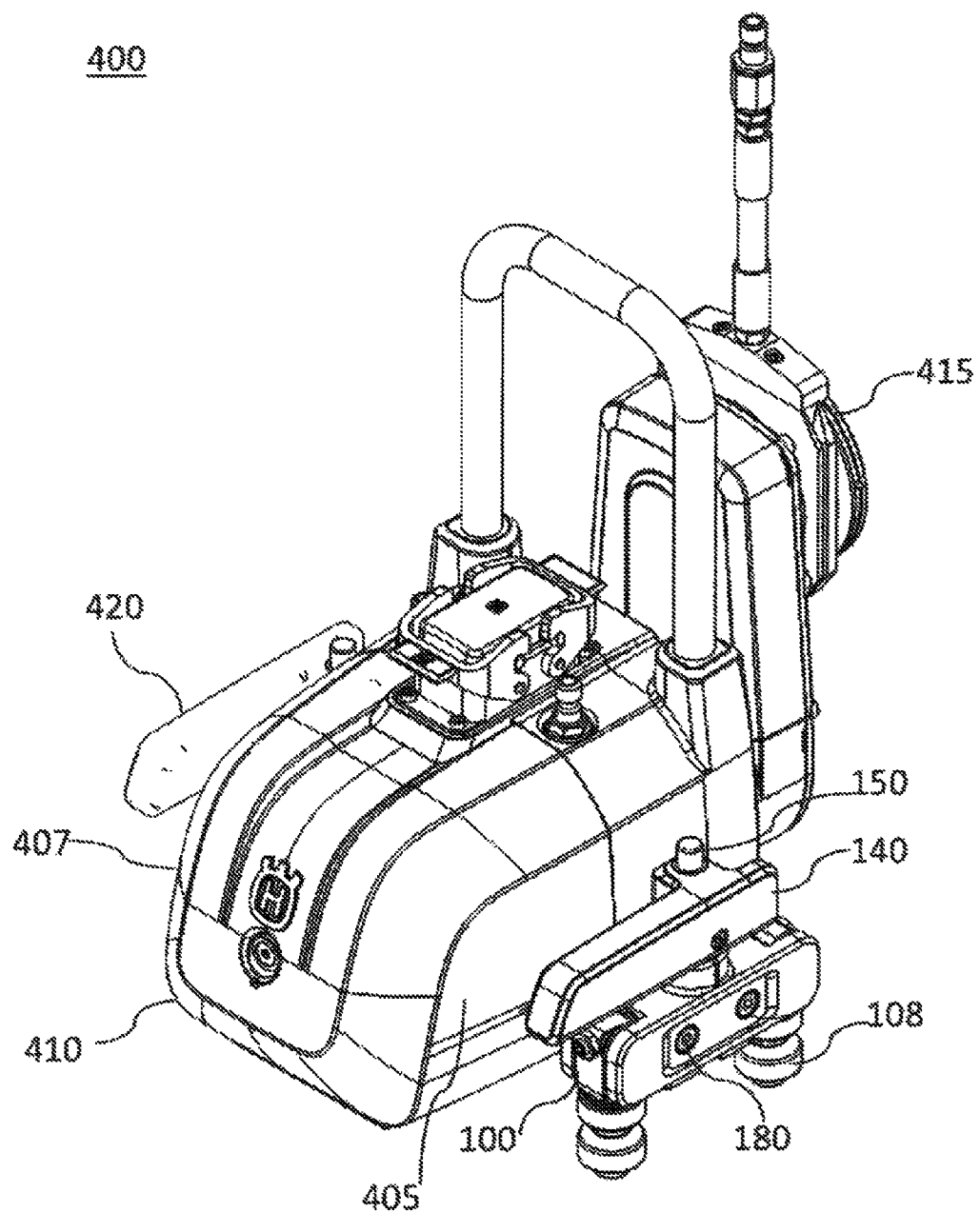
FIG. 4 is an illustration of a pair of saw attachment mechanisms in accordance with an exemplary embodiment of the present disclosure that is assembled to a wall saw motor.

FIG. 4 is an illustration of the saw attachment mechanism 100 illustrated in FIG. 3 assembled to a wall saw motor 400. This term is used for the drive unit of the total wall saw, that also includes at least a track 200, a saw blade with a blade guard. The components of the saw attachment mechanism 100 illustrated in FIG. 4 are substantially similar to the saw attachment illustrated in FIG. 3, and the description of the like saw attachment components have therefore been omitted for brevity. As illustrated in FIG. 4, the saw attachment mechanism 100 is assembled to a first side 405 of the motor housing 410 wall saw 400. More specifically, the saw attachment mechanism 100 is secured to the side wall 405 of the motor housing 410 by a pair of bolts 180. While the illustrated embodiment of FIG. 4 shows a pair of bolts 180, one of ordinary skill in the art will appreciate that fewer or more bolts 180 can be implemented. In at least one embodiment, no bolts can be implemented to secure the saw attachment mechanism 100 to the motor housing 410; instead, the saw attachment mechanism 100 can be welded to the motor housing 410, adhered to the motor housing 410, co-molded to the motor housing 410, or otherwise secured to the motor housing 410 by any securement or attachment.

Also in FIG. 4, the wall saw 400 includes a second saw attachment mechanism 420 coupled to a second side 407 opposite to the first side 405 coupled to the first saw attachment mechanism 100. The second saw attachment mechanism 420 can provide further stability for the wall saw, as the wall saw is operated and traverses the track 200 (not shown) of the wall saw assembly. FIG. 4 further illustrates a blade attachment 415 coupled to a third side of the wall saw housing 410. The third side of the motor housing 410 can the side of the motor housing 410 adjacent to both the first side wall and the second side wall. The blade attachment 415 can be an arm, as illustrated in FIG. 4, to which the cutting blade (not shown) for the wall saw is attached.

The saw attachment mechanisms 100, 420 illustrated in FIG. 4 are positioned in an engaged configuration. In the illustrated engaged configuration, the handle 140 of the saw attachment mechanisms 100, 420 are rotated such that a lengthwise portion the handle 140 is parallel to the side 405, 407 of the housing. To place the handle 140, and thus the saw attachment mechanisms 100, 420 in a disengaged configuration, the handle 140 can be rotated approximately forty-five degrees to rotate the guide roller shafts and thus the guide rollers 105 away from the cam shaft (not shown) and away from a track to which the saw attachment mechanism 100, 420 can be engaged. The assembly of the wall saw 400 assembled having the saw attachment mechanism 100 to a track 200 of a wall saw assembly is illustrates in FIG. 5.

Figure 5:
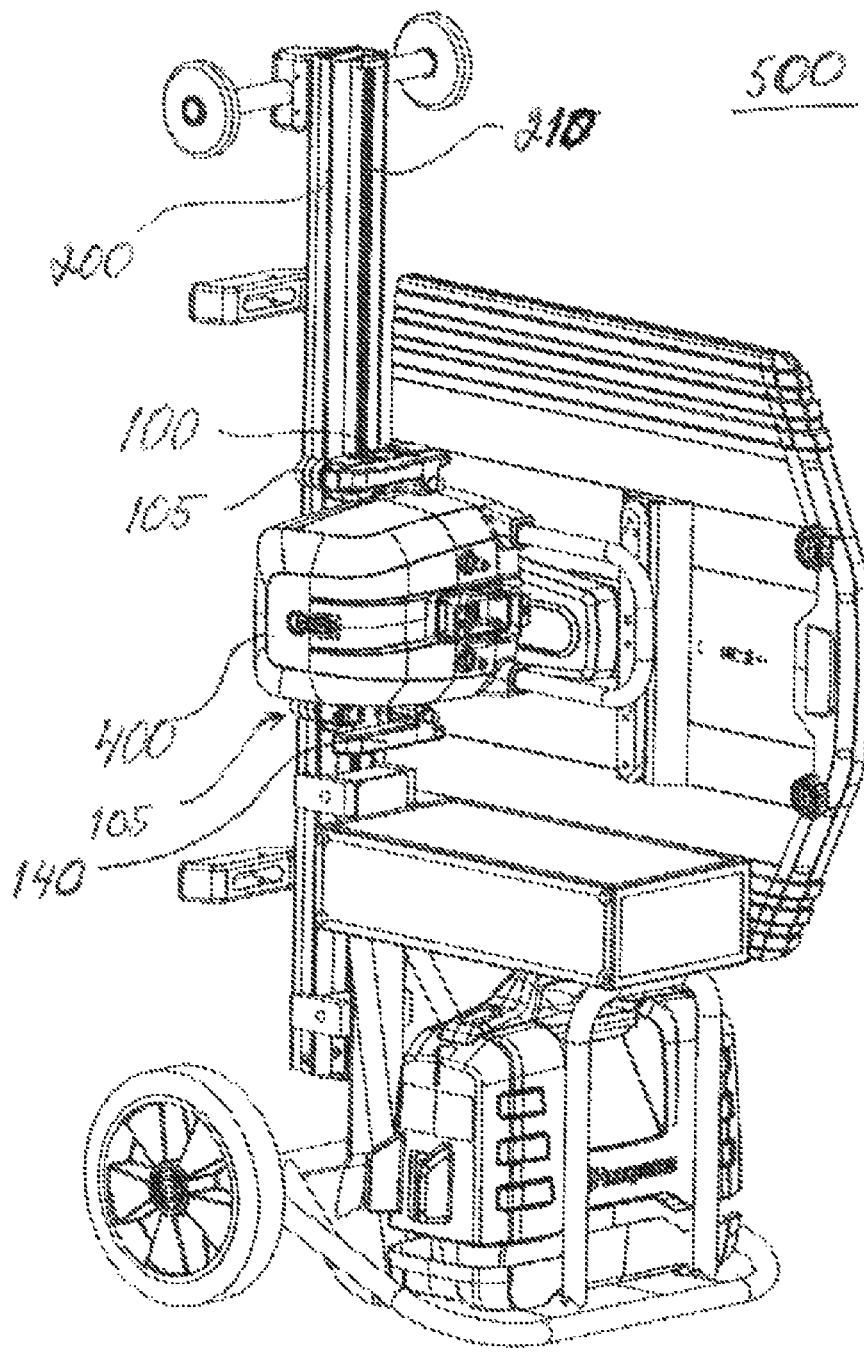
FIG. 5 is an illustration of a wall saw assembly having the wall saw motor attached to track by at least one saw attachment mechanism in accordance with an exemplary embodiment of the present disclosure.

In FIG. 5, the wall saw 400 is attached to the track 200 by two saw engagement mechanisms 100. The track 200 is positioned perpendicularly to the wall saw 400 and the saw attachment mechanisms 100. As illustrated in FIG. 5, the saw attachment mechanisms 100 are in an engaged configuration where each of the guide rollers 105 of the saw attachment mechanisms 100 are engaged with the track 200. Also illustrated in FIG. 5, the track 200 includes a rack 210 that comprises a plurality of gear teeth. The gear teeth of the rack 210 can be configured to engage the slot 170 (not shown) of the rack receiver 165 of the saw attachment mechanism 100. The gear teeth of the rack 210 assist the movement of the wall saw 400 as the wall saw vertically traverses the track 200. The rack 210 can also provide further stability of the wall saw 400 against the track 200 during cutting operations and as the wall saw traverses the track 200.

Figure 6:
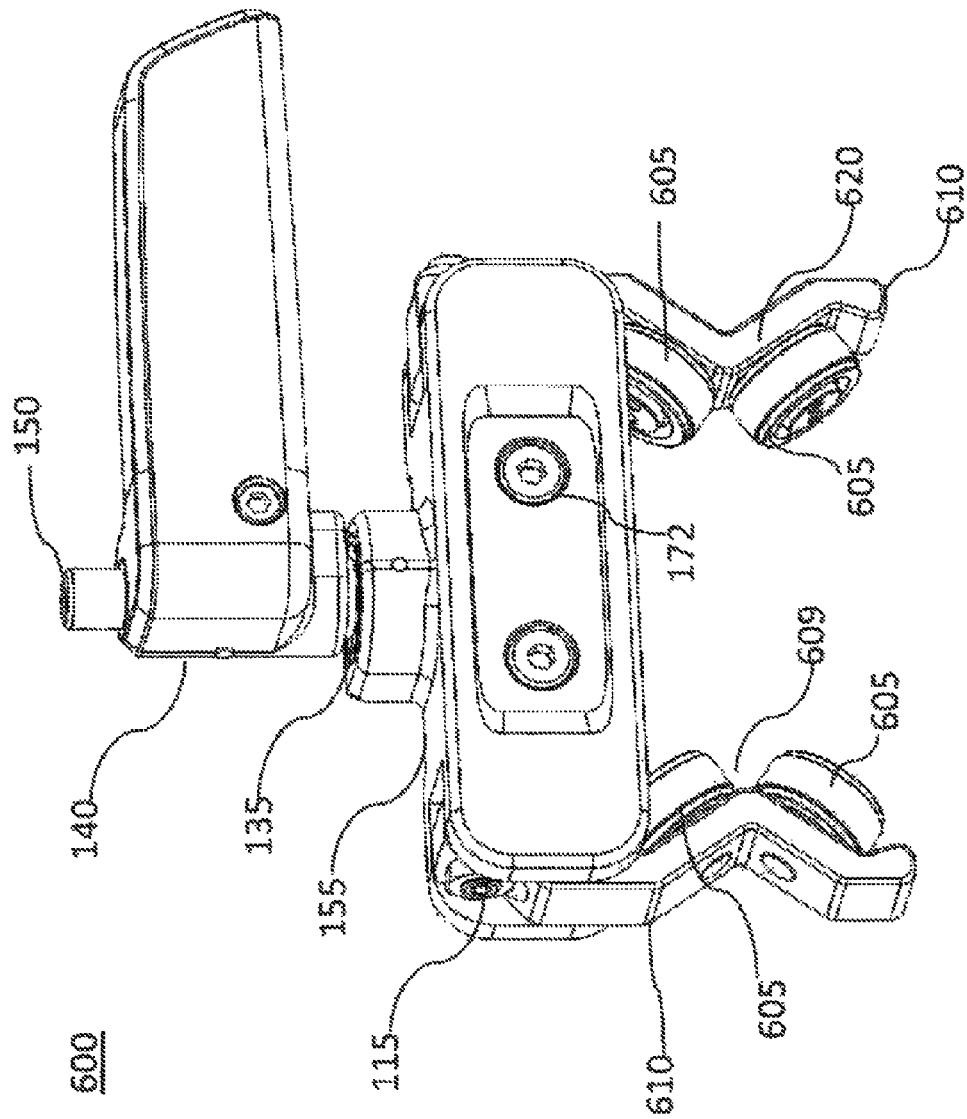
FIG. 6 is an illustration of an alternative embodiment of a wall saw attachment including a guide roller shaft having a zig-zag shape.
Figure 7:
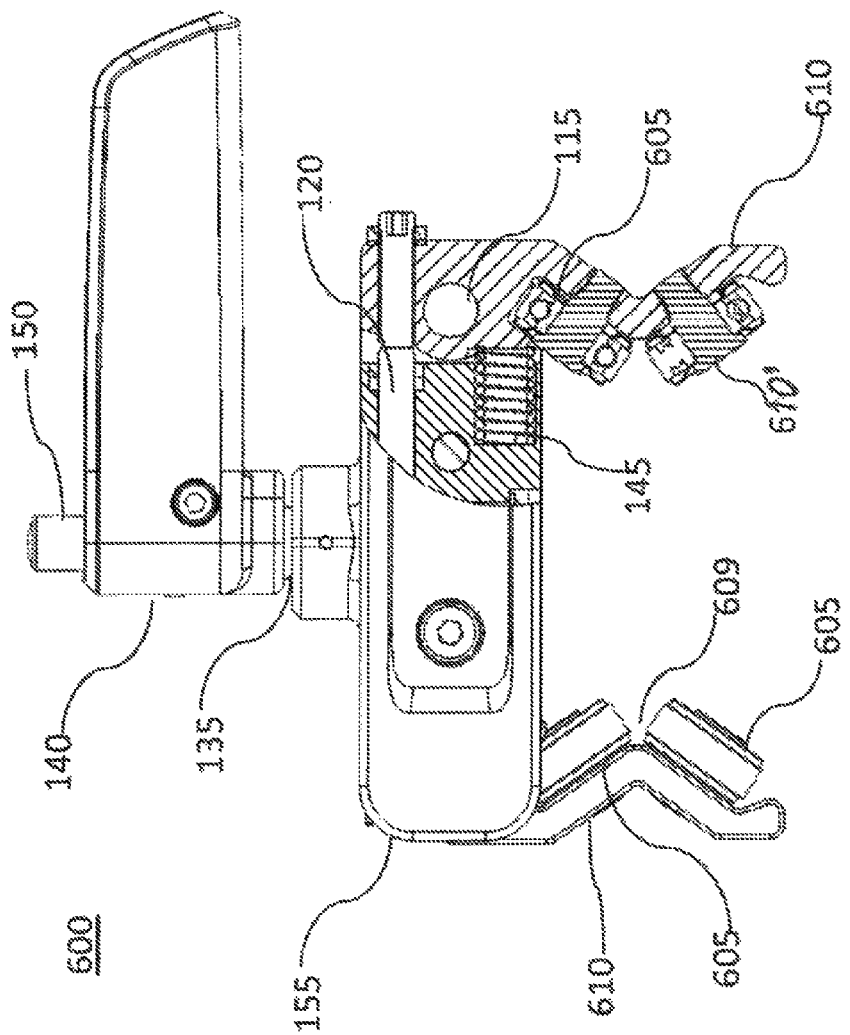
FIG. 7 is front view of the wall saw attachment illustrated in FIG. 6 shown a partial internal view of the internal components of the wall saw attachment.

FIGS. 6 and 7 show an alternative embodiment of a saw attachment mechanism. FIG. 6 is a plan view of the saw attachment mechanism 600, and FIG. 7 illustrates a partial internal view of the saw attachment mechanism 600 illustrated in FIG. 6. The saw attachment mechanism 600 illustrated in FIGS. 6 and 7 is substantially similar the saw attachment mechanism 100 illustrated in FIG. 3. As such, the components illustrated in FIGS. 6 and 7 that are similar to the components illustrated in FIG. 3 bear the same numerals, and the related descriptions have been omitted for brevity. The saw attachment mechanism 600 illustrated in FIGS. 6 and 7 differs from the saw attachment mechanism 100 illustrated in FIG. 3 in that FIGS. 6 and 7 illustrates a guide roller shaft 610 having two guide rollers 605. Specifically, the guide roller shaft 610 is a zig-zag-shaped structure on which the two guide rollers 605 are arranged to be rotatable around guide roller axles 610' fastened to the guide roller shaft 610. Each guide roller axle 610' protrudes from a surface of the guide roller shaft 610. Comparing FIGS. 6 and 7 to FIG. 3, the guide roller shaft 610 in FIGS. 6 and 7 is a structure on which the guide rollers 605 rotate, whereas in FIG. 3, the guide rollers 105 rotate around the guide roller shaft 110 which acts as a guide roller axle. The guide roller shaft 610 illustrated in FIG. 6 can include a bend 620. The guide rollers 610 can be positioned and rotatably secured to the guide roller shaft 610 on an inner face 615, where the first guide roller 605 is positioned on the inner face of the guide roller shaft 610 at a first side of the bend 620, and the second guide roller 605 is positioned on the inner face of the guide roller shaft 610 at a second side opposite to the first. The guide rollers 605 in FIGS. 6 and 7 are positioned such that a groove 602 is formed between a first guide roller and a second guide roller. The groove 609 is configured to receive a projection 205 of the track 200 thereby bounding the upper surface and the lower surface of the track 200 by the guide rollers 605 and thereby securing the saw attachment mechanism 600 (and consequently the wall saw) to the track. The internal components (for example, the pushrod, guide roller pivot, and cam shaft) of the saw attachment mechanism illustrated in FIGS. 6 and 7 are substantially similar to the internal components of the saw attachment mechanism 100 illustrated in FIGS. 1-5. Accordingly, the operation and method of placing the saw attachment mechanism 600 into a disengaged and engaged configuration is similar for the operation and method of placing the saw attachment mechanisms 100 illustrated in FIGS. 1-5.

Exemplary implementations have been described hereinabove regarding a saw attachment mechanism. With the exemplary embodiments of saw attachment mechanism described herein, the cooperation of the pushrods, guide roller shafts, guide rollers and cam shaft allow for the quick and efficient removal of a wall saw or motor of a wall saw from a track of the wall saw assembly. As the cam shaft can be rotated to push or pull the pushrod to engage a guide roller shaft, the guide roller shaft can be positioned between an engaged configuration and a disengaged configuration. As the saw attachment mechanism described herein allow the wall saw to be quickly released from the track at the wall saw's current position, the wall saw user does not need to move the wall saw to a top or bottom of the track prior to removing the wall saw from the track. Additionally, as the saw attachment mechanism allows the releasable attachment of the wall saw at the wall saw's current position on the track, there is no need to remove the wall saw blade from the wall saw motor or housing prior to removing the wall saw from the track.

One of ordinary skill in the art will appreciate that the features in each of the figures described herein can be combined with one another and arranged to achieve the described benefits of the presently disclosed saw attachment mechanism. Additionally, one of ordinary skill will appreciate that the elements and features from the illustrated implementations herein can be optionally included to achieve the described benefits of the presently disclosed saw attachment mechanism. Various modifications to and departures from the disclosed implementations will occur to those having skill in the art. The subject matter that is intended to be within the spirit of this disclosure is set forth in the following claims.

The invention claimed is:

1. A saw attachment mechanism for removably affixing a saw motor to a track, said attachment comprising:
   at least one guide roller shaft pivotally connected to a saw attachment mechanism body; wherein the at least one guide roller shaft is configured to pivot into an engaged configuration or disengaged configuration, wherein a pivot axis of the at least one roller shaft is perpendicular to a longitudinal axis of the at least one roller shaft;
   at least one guide roller configured for releasable engagement with the track, rotatably connected to the at least one guide roller shaft;
   at least one pushrod configured for engagement with the at least one guide roller shaft at a first end and a cam shaft at a second end of the at least one pushrod; and
   a handle coupled to the cam shaft, wherein operation of the handle causes the cam shaft to move the at least one pushrod, which engages the at least one guide roller shaft, biasing the at least one guide roller shaft toward the engaged configuration.

2. The saw attachment mechanism of claim 1, further comprising a return spring for biasing the at least one guide roller toward the disengaged configuration.

3. The saw attachment mechanism of claim 1, further comprising a handle rotation control mechanism coupled to the cam shaft, said rotation control mechanism configured to prevent rotation of the handle.

4. The saw attachment mechanism of claim 3, wherein the rotation control mechanism is a push button.

5. The saw attachment mechanism of claim 1, further comprising a body and said body housing the at least one pushrod, at least a portion of the cam shaft, and at least a portion of the at least one guide roller shaft.

6. The saw attachment mechanism of claim 1, further comprising a guide roller shaft stop configured to prevent rotation of one of the at least one guide roller shaft from rotating beyond a predetermined angle of rotation.

7. The saw attachment mechanism of claim 1, further comprising at least one adjustment mechanism to control the pivoting of one of the at least one guide roller shaft.

8. The saw attachment mechanism of claim 7, wherein the at least one adjustment mechanism comprises a plurality of adjustment mechanisms to control a respective one of the at least one guide roller shaft.

9. The saw attachment mechanism of claim 1, wherein the at least one guide roller comprises a pair of guide rollers, the at least one guide roller shaft comprises a pair of guide roller shafts, and the at least one pushrod comprises a pair of push rods.

10. The saw attachment mechanism of claim 1, wherein the at least one guide roller comprises a plurality of guide rollers, the at least one guide roller shaft comprises a plurality of guide roller shafts, and the at least one pushrod comprises a plurality of push rods.

11. The saw attachment mechanism of claim 1, wherein the at least one guide roller shaft comprises a first guide roller shaft and a second guide roller shaft, wherein the first guide roller shaft is pivotally connected to the saw attachment mechanism body and the second guide roller shaft is fixedly connected to the saw attachment mechanism body.

12. The saw attachment mechanism of claim 1, wherein the rotatable connection between the at least one guide roller shaft and the at least one guide roller comprises a guide roller axle.

13. The saw attachment mechanism of claim 1, wherein the at least one guide roller shaft comprises a first guide roller shaft and a second guide roller shaft; the at least one pushrod comprises a first pushrod and a second push rod; and
   wherein operation of the handle causes the cam shaft to move the first and second pushrods, which engage the respective first and second guide roller shafts, biasing the respective first and second guide roller shafts toward the engaged configuration.

14. The saw attachment mechanism of claim 1, further comprising a return spring for biasing the at least one guide roller toward the disengaged configuration.

15. A track system comprising
   a track; and
   a saw attachment mechanism configured to removably affix a saw motor to the track, the saw attachment mechanism including:
   at least one guide roller shaft pivotally connected to a saw attachment mechanism body; wherein the at least one guide roller shaft is configured to pivot into an engaged configuration or disengaged configuration, wherein a pivot axis of the at least one roller shaft is perpendicular to a longitudinal axis of the at least one roller shaft;

at least one guide roller configured for releasable engagement with the track, rotatably connected to the at least one guide roller shaft;

at least one pushrod configured for engagement with the at least one guide roller shaft at a first end and a cam shaft at a second end of the at least one pushrod; and a handle coupled to the cam shaft, wherein operation of the handle causes the cam shaft to move the at least one pushrod, which engages the at least one guide roller shaft, biasing the at least one guide roller shaft toward the engaged configuration.

16. A wall saw comprising a saw motor;

a track; and a saw attachment mechanism configured to removably affix the saw motor to the track, the saw attachment mechanism including:

at least one guide roller shaft pivotally connected to a saw attachment mechanism body; wherein of the at least one guide roller shaft is configured to pivot into an engaged configuration or disengaged configuration, wherein a pivot axis of the at least one roller shaft is perpendicular to a longitudinal axis of the at least one roller shaft;

at least one guide roller configured for releasable engagement with the track, rotatable connected to a respective at least one guide roller shaft;

at least one pushrod configured for engagement with one of the at least one guide roller shaft at a first end and a cam shaft at a second end of the at least one pushrod; and a handle coupled to the cam shaft, wherein operation of the handle causes the cam shaft to move the at least one pushrod, which engages the at least one guide roller shaft, biasing the at least one guide roller shaft toward the engaged configuration.

* * * * *